Aug. 12, 1958     A. E. BLOMQUIST     2,847,049
INFLATING AND DEFLATING MEANS FOR PNEUMATIC-HYDRAULIC TIRE
Filed Sept. 21, 1956
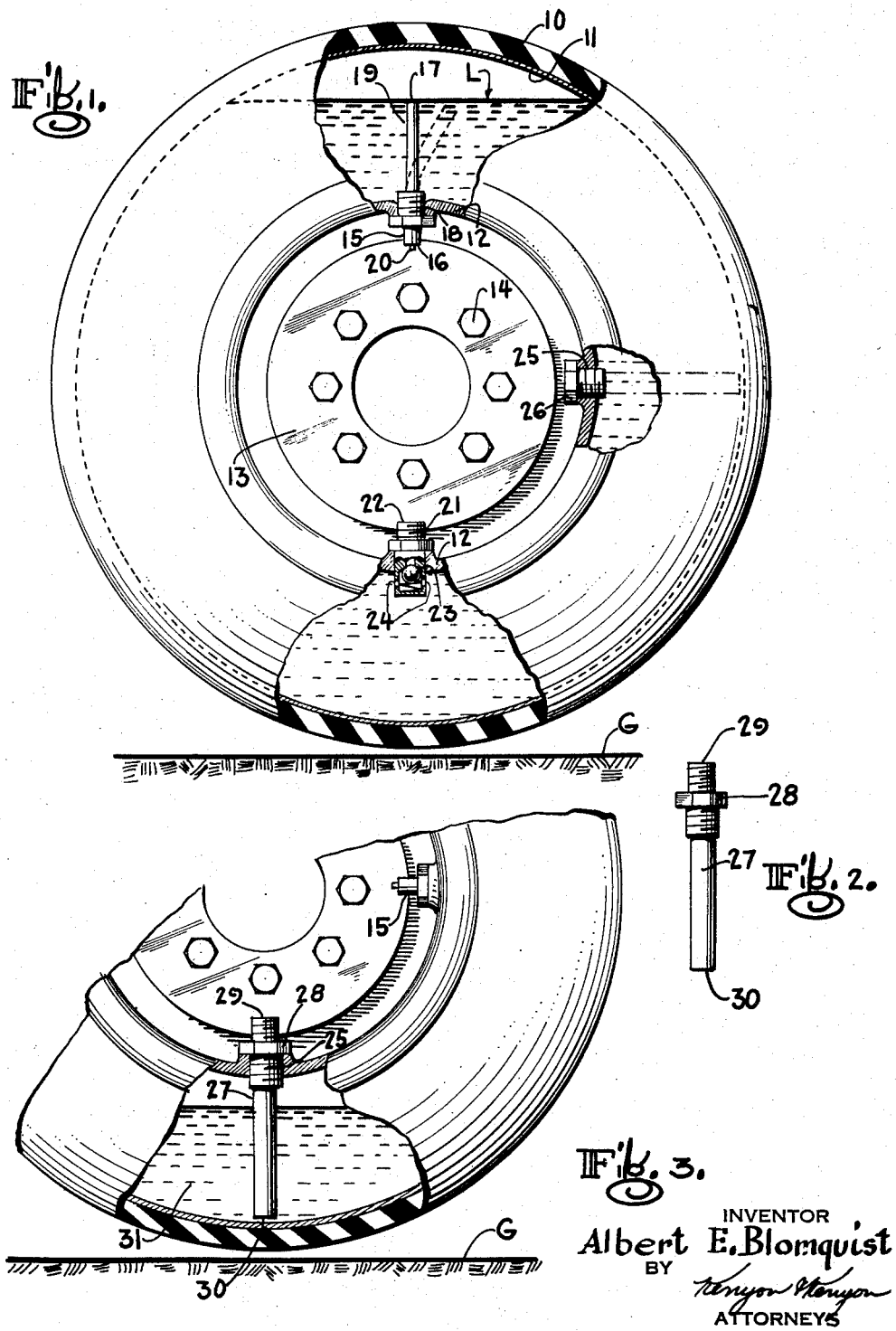
INVENTOR
Albert E. Blomquist
BY
ATTORNEYS

United States Patent Office 2,847,049
Patented Aug. 12, 1958

2,847,049

INFLATING AND DEFLATING MEANS FOR PNEUMATIC-HYDRAULIC TIRE

Albert E. Blomquist, Ringoes, N. J.

Application September 21, 1956, Serial No. 611,334

4 Claims. (Cl. 152—330)

This invention relates to pneumatic tires of the type which may be utilized with more or less water or similar liquid contained therein in addition to air, this type of tire being most common in the case of large size tires for use on tractors and being referred to hereinafter for the sake of brevity as a pneumatic-hydraulic tire. This invention relates more particularly to inflating and deflating means for a pneumatic-hydraulic tire whereby water as well as air may be introduced into and removed from the tire.

Special problems are encountered in providing a convenient and effective means for admitting water and, when desired, substantially emptying the water from the tire. Complicated valve mechanisms have been proposed for this purpose which have the disadvantages of being relatively ineffective in use. Accordingly it is an object of this invention to provide an improved means for inflating and deflating a pneumatic-hydraulic tire which is simple and inexpensive and in operation is both effective and convenient.

The nature of this invention and the practice thereof will be apparent from the following description of a typical preferred embodiment which has been shown for purposes of illustration in the accompanying drawings, wherein:

Fig. 1 is a side elevation of a rim having a pneumatic-hydraulic tire mounted thereon and comprising the improved inflating and deflating means of this invention;

Fig. 2 is a side elevation of the removable tube used in emptying liquid from the tire; and Fig. 3 is a partial view similar to Fig. 1 showing the tire after having been rotated through 90° to position occupied when discharging liquid from the tire and showing the removable liquid discharge tube in place.

The inflating and deflating means of this invention may be utilized whether the tire is of the tubeless type or is one which utilizes an inner tube. In the accompanying drawing a tire of the tubeless type is shown which comprises a heavy tread portion 10 having the impermeable inner liner 11, the tire being mounted on a rim 12 which is integral with the hub portion 13 that is adapted to be secured as by bolts 14 to conventional mounting means for a vehicle wheel.

Passing through the rim 12, there is a first conduit 15 which has an exterior opening at 16 at one end and an interior opening at 17 at the other end. Herein and in the claims the word "exterior" refers to parts disposed on the outside of the tire and rim combination while the term "interior" refers to parts on the inside. The conduit is maintained in fluid-tight relation to the rim 12 by suitable securing means 18.

The interior opening 17 of the conduit 15 is disposed substantially at the squash line of the tire, the squash line, as is well known in the art, being the line to which the inner surface of the tire becomes deformed when the tire is resting on the ground under normal load and under normal inflation. The portion 19 of the conduit 15 is composed of imperforate, yieldable, resilient material which tends to maintain the conduit in the position shown in solid lines in Fig. 1, but which permits deformation, as to the position shown in dotted lines, so as to prevent possible breakage or injury to this part in the event of extensive deformation of the tire in use. Adjacent the exterior opening 16 there is a removable one-way valve, the details of which have not been shown except for the stem 20, since the valve typically is a conventional air valve of the kind used for a pneumatic tire. As is conventional in such a valve, the valve insides may be readily removed. The valve, of course, permits ingress of air and prevents egress of air or other fluid when the valve insides is in place.

Approximately 180° from the conduit 15 there is a second conduit 21 which passes through the rim 12 and has its interior end adjacent the inner surface of the rim. Preferably this conduit is of substantially larger internal diameter than the internal diameter of the conduit 15. The conduit 21 has an exterior opening at 22 and adjacent this opening the conduit 21 may be threaded so as to facilitate the attachment of a fluid line for forcing water into the tire. Within the conduit 21 there is a one-way valve 23 which may be a ball valve as shown for permitting ingress of water while preventing egress of either air or water. The opening 24 at the interior of the tire is adjacent the rim so as not to interfere with normal operation of the tire.

The rim 12 is provided with a port 25 approximately 90° from the other two conduits. This port has a removable sealing plug 26 which, during use of the vehicle, is in place and has no function except to provide a fluid-tight closure. The port 25 also has a removable tube 27 adapted to be inserted therethrough and held in fluid-tight relation to the port 25 by the gland 28. The tube has an exterior opening at 29 and its interior opening 30 extends into the tire so as to be adjacent the maximum radial spacing of the inner surface of the tire from the rim.

In using the inflating and deflating means of this invention the tire and rim are first disposed in the position shown in Fig. 1. The valve insides is removed from the conduit 15 and a water supply line is attached to the end of the conduit 21. The pressure of the water is adapted to cause the opening of the valve 23 and the water passes into the interior of the tire. Since the conduit 21 may be made with a relatively large internal diameter such as about ½ inch in the case of a large tire, the filling of the tire may proceed very rapidly. Since the valve insides is removed, rapid discharge of air through the conduit 15 likewise is permitted. The amount of water forced into the tire may be any amount that is desired but may be proceeded with until the liquid level indicated at L in Fig. 1 reaches the squash line, which is determined by the interior opening of the conduit 15. After the tire has been filled with water, the valve insides may be replaced in the conduit 15 and the tire inflated with air to the desired pressure. The tire is then ready for use, the port 25 being closed by the plug 26 at all times during this filling operation. The filling of the tire is normally carried out while the tire is jacked up so as to be separated from the ground, which is indicated at G.

When it is desired to remove the water from the tire, the tire is turned to the position shown in Fig. 3. The plug 26 is removed from the port 25 and the tube 27 is inserted into the port 25 so that its inner end is adjacent the inner surface of the tire. Upon then attaching the threaded end of the conduit 15 to an air supply line or the like, air blown into the tire will cause the rapid emptying of the water through the tube 27 until substantially no water is left. By using a relatively large diameter tube for the tube 27, such as a tube having an internal diameter of about ½ inch for a large size tire, the emptying operation can be carried out very rapidly. By employment of the removable tube 27 the residual body of water 31 which would not otherwise be removed may be conveniently and quickly ejected.

The foregoing is the preferred embodiment of the practice of this invention wherein a separate port 25 is employed in addition to the other two conduits. However, the conduit 21 as shown may be readily removable from the rim so that the tube 27 may be inserted in the same opening formerly occupied by the conduit 21. In such case the emptying of the tire may be effected when the parts are in the position shown in Fig. 1 and the port occupied by the conduit 21 is the emptying port.

While the port 25 preferably is spaced at least about 90° from the conduit 15, other substantial spacing from the conduit 15 may be employed as may be convenient in inserting and removing the tube 27 and in attaching an air hose to the conduit 15. Similarly, the spacing of the conduit 21 from the conduit 15 may be varied as may be convenient.

While this invention has been illustrated in connection with a tubeless tire, it is apparent that, if desired, appropriate openings may be provided in an inner tube for securement of the above-mentioned parts to the tube, as by vulcanization in conventional manner, and in such case the parts also would pass through openings in the rim on which the tire and tube are mounted.

I claim:

1. In combination with a rim having a penumatic-hydraulic tire mounted thereon, inflating and deflating means for said tire comprising a first conduit passing through said rim having an exterior opening at one end adapted for attachment of an air supply line thereto and an interior opening spaced substantially from the inner surface of said rim on the interior of said tire, said conduit being composed of substantially imperforate semi-rigid material extending from the inner surface of said rim to said interior opening adapted to yieldably maintain said interior opening substantially at a predetermined spacing from the inner surface of said rim, a removable one-way valve in said first conduit adapted to permit ingress of fluid into and prevent egress of fluid from said tire, a second conduit passing through said rim spaced substantially from said first conduit having an exterior opening adapted for the attachment of a liquid supply line thereto and an interior opening adjacent said rim, a one-way valve in said second conduit adapted to permit ingress of fluid into and prevent egress of fluid from said tire, and port means passing through said rim spaced substantially from said first conduit and extending from adjacent the exterior of said rim to the interior of said tire adjacent said rim, said port having a removable closure adapted to normally close it to prevent egress of fluid from said tire and a removable tube insertable in said port in fluid-tight relation therewith and extending from adjacent the maximum radial spacing of the inner surface of said tire from said rim to the exterior of said rim for discharge of liquid from said tire upon injecting air through said first conduit when said rim is disposed with said port in approximately its lowermost position.

2. The combination according to claim 1 wherein the said interior opening of said first conduit is disposed approximately at the squash line of the tire.

3. In combination with a rim having a pneumatic-hydraulic tire mounted thereon, inflating and deflating means for said tire comprising a first conduit passing through said rim having an exterior opening at one end adapted for attachment of an air supply line thereto and an interior opening substantially at the squash line of the tire, said conduit being composed of substantially imperforate semi-rigid material extending from the inner surface of said rim to said interior opening adapted to yieldably maintain said interior opening substantially at said squash line, a removable one-way valve in said first conduit adapted to permit ingress of fluid into and prevent egress of fluid from said tire, a second conduit passing through said rim substantially spaced from said first conduit adapted for attachment of a liquid supply line thereto and an interior opening adjacent said rim, a one-way valve in said second conduit adapted to permit ingress of fluid into and prevent egress of fluid from said tire, and port means passing through said rim spaced substantially from said first and second conduits and extending from the exterior of said rim to the interior of said tire adjacent said rim, said port means having a removable closure adapted to normally close it to prevent egress of fluid from said tire, and a removable tube insertable in said port and in fluid-tight relation therewith and extending from adjacent the maximum radial spacing of the inner surface of said tire from said rim to the exterior of said rim for discharge of liquid from said tire upon injecting air through said first conduit when said rim is disposed with said port in approximately lowermost postion.

4. In combination with a rim having a pneumatic-hydraulic tire mounted thereon, inflating and deflating means for said tire comprising a first conduit passing through said rim having an exterior opening at one end adapted for attachment of an air supply line thereto and an interior opening substantially at the squash line of the tire, said conduit being composed of substantially imperforate semi-rigid material extending from the inner surface of said rim to said interior opening adapted to yieldably maintain said interior opening substantially at said squash line, a removable one-way valve in said first conduit adapted to permit ingress of fluid into and prevent egress of fluid from said tire, port means passing through said rim substantially spaced from said first conduit and extending from the exterior of said rim to the interior of said tire adjacent said rim, said port having a removable one-way valve adapted to permit ingress of fluid into and prevent egress of fluid from said tire and a removable tube insertable in said port in fluid-tight relation therewith and extending from adjacent the maximum radial spacing of the inner surface of said tire from said rim to the exterior of said tire for discharge of liquids from said tire upon injecting air into said tire through said first conduit while said port is in approximately lowermost position.

References Cited in the file of this patent
UNITED STATES PATENTS

| | | |
|---|---|---|
| 2,203,564 | Farnsworth | June 4, 1940 |
| 2,323,495 | Steidinger | July 6, 1943 |